US012719971B2

(12) United States Patent
Pi

(10) Patent No.: US 12,719,971 B2
(45) Date of Patent: Aug. 25, 2026

(54) ELECTRONIC DEVICE

(71) Applicant: VIVO MOBILE COMMUNICATION CO., LTD., Guangdong (CN)

(72) Inventor: Yupeng Pi, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 272 days.

(21) Appl. No.: 18/634,184

(22) Filed: Apr. 12, 2024

(65) Prior Publication Data

US 2024/0267445 A1 Aug. 8, 2024

Related U.S. Application Data

(63) Continuation of application No. PCT/CN2022/124885, filed on Oct. 12, 2022.

(30) Foreign Application Priority Data

Oct. 13, 2021 (CN) .......................... 202111194721.7

(51) Int. Cl.
*H04M 1/02* (2006.01)

(52) U.S. Cl.
CPC ....... *H04M 1/0235* (2013.01); *H04M 1/0268* (2013.01); *H04M 1/0274* (2013.01)

(58) Field of Classification Search
CPC ............. H04M 1/0235; H04M 1/0237; H04M 1/0239; H04M 1/0206; H04M 1/0208; H04M 1/0268; H04M 1/0269; H04M 1/0266; H04M 1/0274
See application file for complete search history.

(56) References Cited

U.S. PATENT DOCUMENTS

2018/0176352 A1 6/2018 Shin et al.
2021/0181800 A1 6/2021 Ko et al.
2022/0342448 A1* 10/2022 Shin ...................... G06F 1/1624
2023/0088917 A1 3/2023 Zhong

FOREIGN PATENT DOCUMENTS

| | | | |
|---|---|---|---|
| CN | 111683166 | A | 9/2020 |
| CN | 113301201 | A | 8/2021 |
| CN | 113452821 | A | 9/2021 |
| CN | 113938545 | A | 1/2022 |
| EP | 4239444 | A1 | 9/2023 |
| WO | 2021034146 | A1 | 2/2021 |

* cited by examiner

*Primary Examiner* — Keith Ferguson
(74) *Attorney, Agent, or Firm* — Price Heneveld LLP

(57) ABSTRACT

This application discloses an electronic device. The electronic device includes a first housing, a second housing, a display screen, and a first joint part. The display screen is disposed on the first housing and the second housing. There are a drawn-out state and a drawn-back state of the electronic device. When the drawn-back state of the electronic device is switched to the drawn-out state, the first housing and the second housing become farther from each other along a first direction, and the first joint part moves along a second direction to join a lateral wall of the first housing and a lateral wall of the second housing. The first direction is perpendicular to the second direction, and the first direction and the second direction both are parallel to a plane on which the display screen is located.

11 Claims, 8 Drawing Sheets

ELECTRONIC DEVICE

CROSS-REFERENCE TO RELATED APPLICATIONS

This application is a Bypass Continuation Application of PCT International Application No. PCT/CN2022/124885 filed on Oct. 12, 2022, which claims priority to Chinese Patent Application No. 202111194721.7 filed on Oct. 13, 2021, which are incorporated herein by reference in their entireties.

TECHNICAL FIELD

This application pertains to the technical field of communication devices, and in particular, to an electronic device.

BACKGROUND

With extendable screens used, extendibility of mobile phone housings better meets a requirement of users.

In a related technology, a mobile phone housing usually includes two housing parts. When the mobile phone housing is in a drawn-back state, the two housing parts join each other; and when the mobile phone housing is in a drawn-out state, a gap is formed between the two housing parts. As a result, a mobile phone looks less fine, a surface of the mobile phone housing is not even, and user experience in holding the mobile phone is not good. In addition, the gap reduces leakproofness of the mobile phone and increases the likelihood of dust and other stuff entering the mobile phone, affecting a service life of the mobile phone.

SUMMARY

The embodiments of this application provide an electronic device, including a first housing, a second housing, a display screen, and a first joint part.

The display screen is disposed on the first housing and the second housing, there are a drawn-out state and a drawn-back state of the electronic device, and when the drawn-back state of the electronic device is switched to the drawn-out state, the first housing and the second housing become farther from each other along a first direction, and the first joint part moves along a second direction to join a lateral wall of the first housing and a lateral wall of the second housing.

The first direction is perpendicular to the second direction, and the first direction and the second direction both are parallel to a plane on which the display screen is located.

In the embodiments of this application, in a process in which the drawn-back state of the electronic device is switched to the drawn-out state, the first housing and the second housing become farther from each other along the first direction, and a gap is formed between the lateral wall of the first housing and the lateral wall of the second housing. In this case, the first joint part moves relative to the first housing and the second housing along the second direction, to join the lateral wall of the first housing and the lateral wall of the second housing. In other words, the first joint part moves to the gap and fills the gap.

REFERENCE NUMERALS

Figure 1:
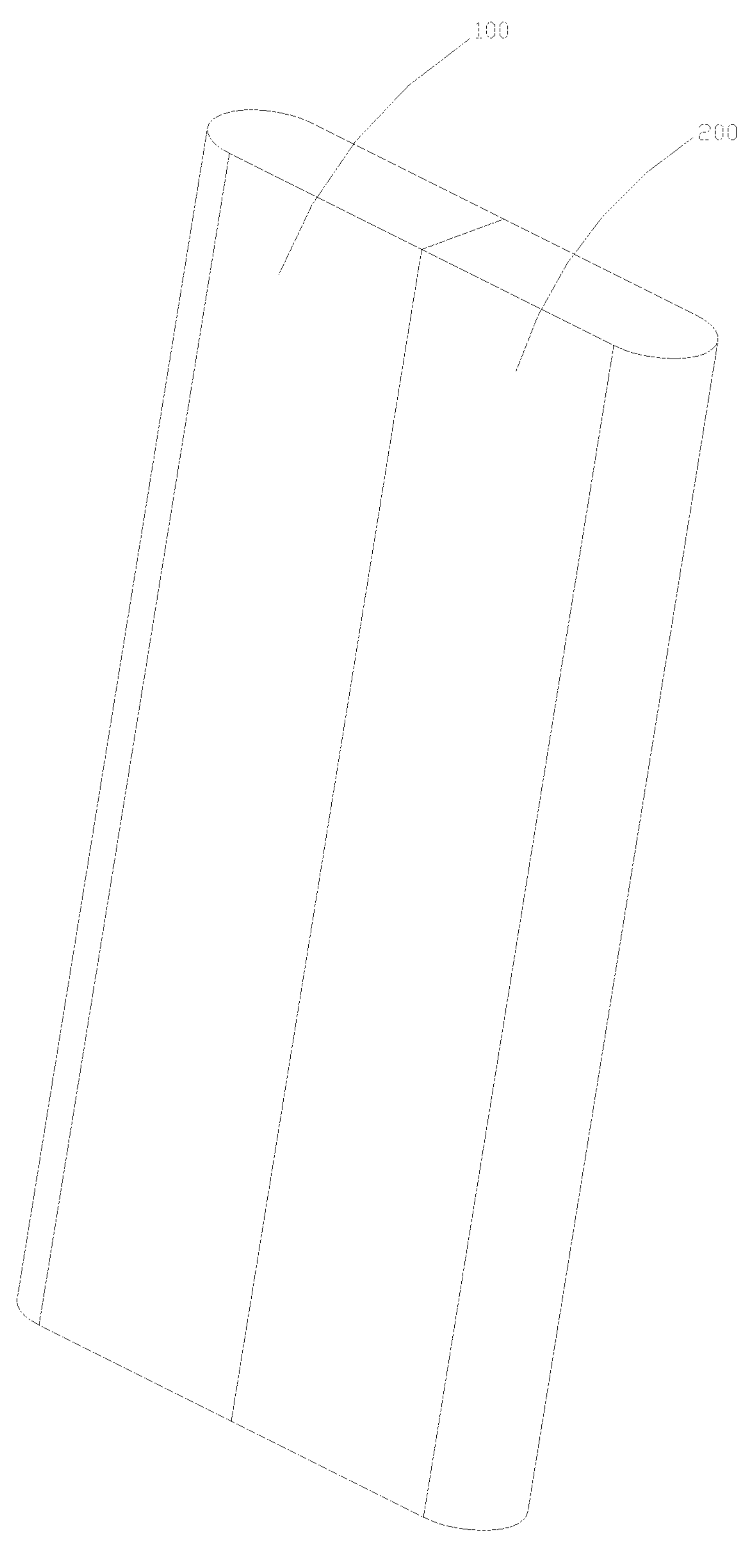
FIG. 1 is a schematic diagram of an exterior of an electronic device in a drawn-back state according to an embodiment of this application.

- 100: first housing;
- 200: second housing;
- 300: joint housing component; 310: first joint part; 311: hook part; 320: second joint part; 330: corner member; and 331: engagement surface;
- 400: device body; and 410: guide slot;
- 510: first elastic member; 511: fixed part; and 512: curved part;
- 520: actuating motor; 530: lead screw; and 540: screw bushing;
- 600: connection member; 610: limiting protrusion; 611: limiting groove; and 612: limiting column;
- 700: second elastic member; and
- 800: guide surface.

DESCRIPTION OF EMBODIMENTS

The following clearly describes technical solutions in embodiments of this application with reference to the accompanying drawings in the embodiments of this application. Clearly, the described embodiments are some of but not all the embodiments of this application. All other embodiments obtained by a person of ordinary skill in the art based on the embodiments of this application shall fall within the protection scope of this application.

The terms "first", "second", and the like in the description and the claims of this application are used to distinguish between similar objects instead of describing a specific order or sequence. It should be understood that data used in such a way are interchangeable in proper circumstances, so that the embodiments of this application can be implemented in an order other than the order illustrated or described herein. Objects classified by "first", "second", and the like are usually of a same type, and a quantity of objects is not limited. For example, there may be one or more first objects. In addition, in the description and the claims, "and/or" represents at least one of connected objects, and a character "/" generally represents an "or" relationship between associated objects.

With reference to the accompanying drawings, an electronic device provided in the embodiments of this application will be described in detail by using specific examples and application scenarios thereof.

Refer to FIG. 1 to FIG. 9. An electronic device disclosed in the embodiments of this application includes a first housing 100, a second housing 200, a display screen, and first joint parts 310. The first housing 100 and the second housing 200 are basic members of the electronic device and can provide a basis for mounting some functional components of the electronic device, for example, for mounting a main structure of the electronic device onto the first housing 100. The main structure includes a display screen, a circuit board, a battery, a camera lens, and the like.

In the embodiments, the display screen is disposed on the first housing 100 and the second housing 200. The display screen may be a flexible screen. Optionally, an edge of the display screen is connected to the first housing 100 and is also connected to the second housing 200.

The first housing 100 and the second housing 200 may move relative to each other along a first direction. Along with relative motion of the two housings, the first housing 100 and the second housing 200 becomes farther from each other. A gap is formed between the first housing 100 and the second housing 200, and the gap becomes increasingly larger, with a size of the display screen becoming larger. Optionally, the first housing 100 and the second housing 200 may move relative to each other along a direction opposite to the first direction. In this case, along with relative motion of the two housings, the first housing 100 and the second housing 200 becomes closer to each other. The gap between the first housing 100 and the second housing 200 becomes smaller, with the size of the display screen becoming smaller.

The first joint parts 310 may move relative to the first housing 100 and the second housing 200. A moving direction is a second direction. The second direction is perpendicular to the first direction, and the first direction and the second direction both are parallel to a plane on which the display screen is located. In addition, the first joint parts 310 corresponds to a lateral wall of the first housing 100 and a lateral wall of the second housing 200.

Optionally, the first joint parts 310 may be connected to the second housing 200 and move with the second housing 200 relative to the first housing 100. The first joint parts may alternatively be connected to neither the first housing 100 nor the second housing 200. In other words, the first joint parts 310 can move or stay standstill in the second direction and stay fixed in the first direction.

Figure 3:
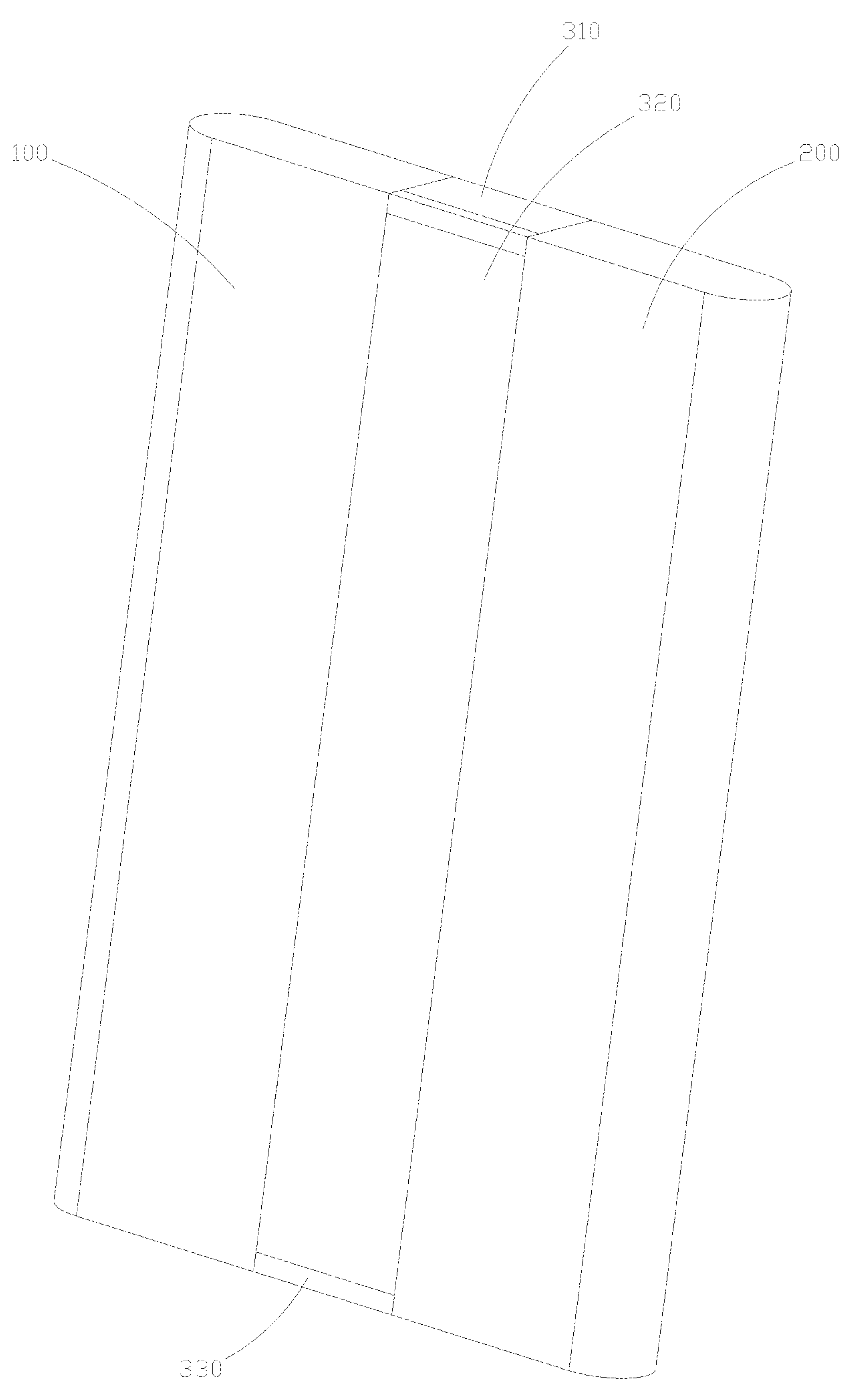
FIG. 3 is a schematic diagram of an exterior of an electronic device in a drawn-out state according to an embodiment of this application.
Figure 4:
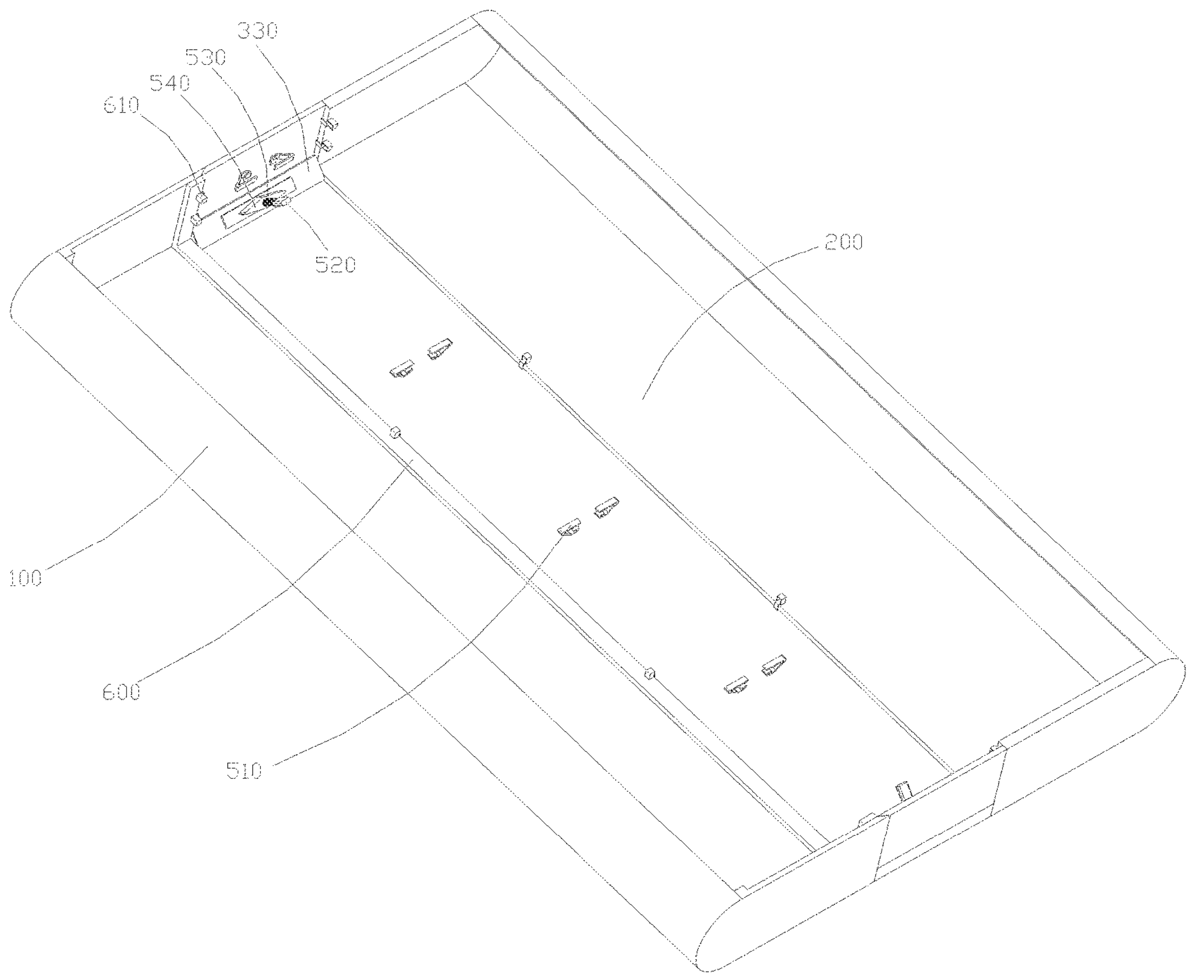
FIG. 4 is a schematic diagram of an interior of an electronic device in a drawn-out state according to an embodiment of this application.

Any case in which the first joint parts 310 can fill a gap between the lateral wall of the first housing 100 and the lateral wall of the second housing 200 can meet a requirement. There are a drawn-out state and a drawn-back state of the electronic device. When the drawn-back state of the electronic device is switched to the drawn-out state, the first housing 100 and the second housing 200 become farther from each other along the first direction. In this case, a gap is formed between the lateral wall of the first housing 100 and the lateral wall of the second housing 200. In this case, the first joint parts 310 move relative to the first housing 100 and the second housing 200 along the second direction, to join the lateral wall of the first housing 100 and the lateral wall of the second housing 200. In other words, the first joint parts 310 move to the gap, and an edge of the first joint parts 310 is in contact with an edge of the lateral wall of the first housing 100 and is also in contact with an edge of the lateral wall of the second housing 200, to fill the gap. As shown in FIG. 3 and FIG. 4, the electronic device switches to the drawn-out state, and the first housing 100, the second housing 200, the first joint parts 310 form a first accommodating space together.

With such disposition, the first joint parts 310 can fill the gap between the lateral wall of the first housing 100 and the lateral wall of the second housing 200, to ensure evenness of the appearance of the electronic device, provide an electronic device with a better look and better user experience, and with no gap, dust and stuff can be prevented from entering the electronic device, avoiding affecting a service life of the electronic device.

Optionally, the electronic device can switch from the drawn-out state to the drawn-back state. In a process in which the drawn-out state of the electronic device is switched to the drawn-back state, as the first joint parts 310 at the gap prevent the first housing 100 and the second housing 200 from becoming closer to each other, the first joint parts 310 need to return to an original position along a direction opposite to the second direction, so that the first joint parts 310 leave the gap, to stop preventing the first housing 100 and the second housing 200 from becoming closer to each other. After the first joint parts 310 leave the gap, the first housing 100 and the second housing 200 can become closer to each other along the direction opposite to the first direction, until the first housing 100 and the second housing 200 are in contact with each other face to face, to achieve the drawn-back state.

Figure 2:
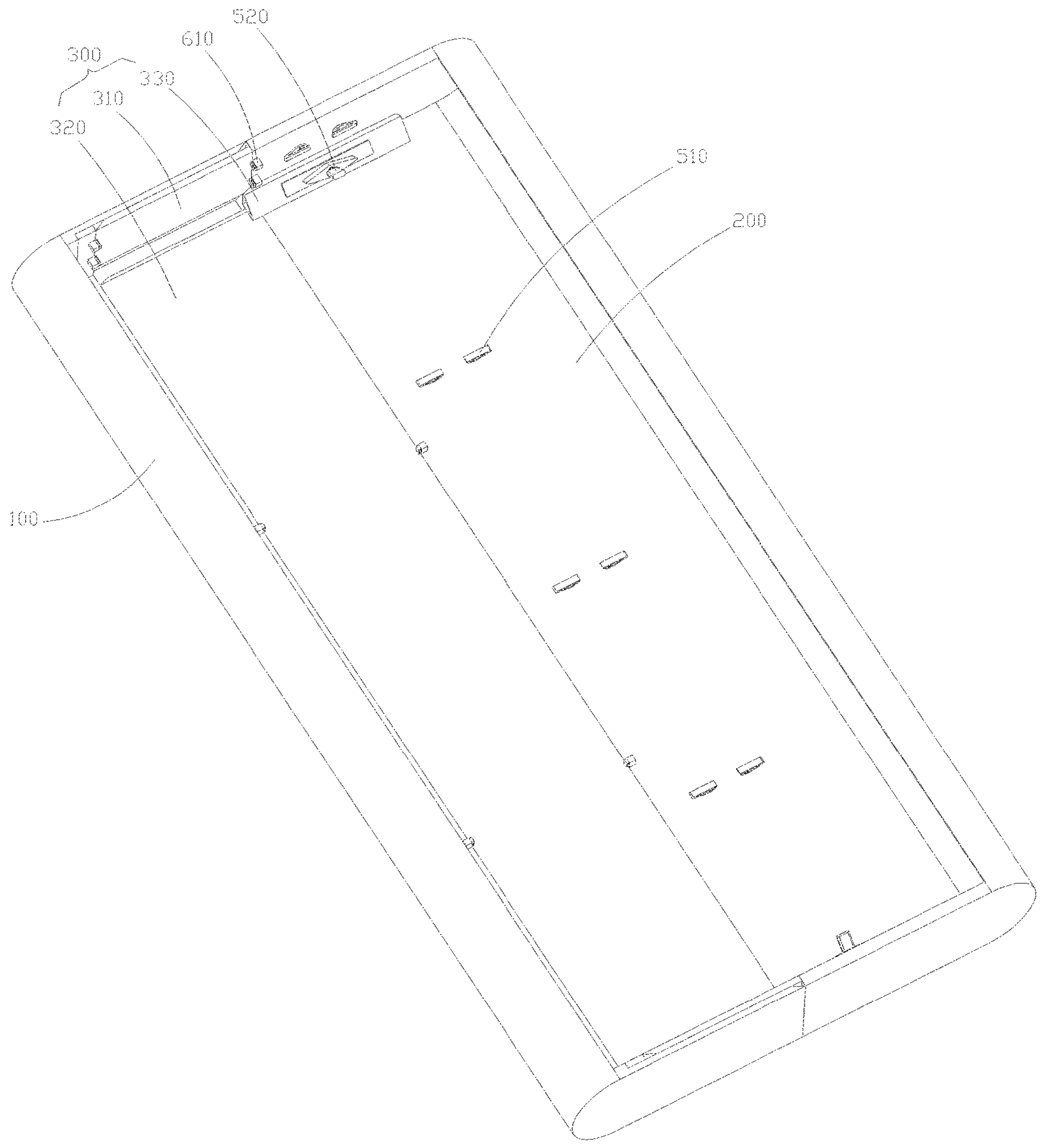
FIG. 2 is a schematic diagram of an interior of an electronic device in a drawn-back state according to an embodiment of this application.

In the embodiments, the first joint parts 310 are connected on one side that is of the second housing 200 and that is closer to the first housing 100, and therefore, the first joint parts 310 may move with the second housing 200 relative to the first housing 100. In a process in which the first housing 100 and the second housing 200 becomes closer to each other, because the first joint parts 310 move with the second housing 200 relative to the first housing 100, the first joint parts 310 are finally accommodated in the first housing 100, until the first housing 100 and the second housing 200 move relative to each other to a position where the two housings come in contact with each other. As shown in FIG. 1 and FIG. 2, the electronic device switches to a second drawn-back state. In this case, the first housing 100 and the second housing 200 form a second accommodating space. A volume of the first accommodating space is greater than a volume of the second accommodating space.

In a further technical solution, as shown in FIG. 2, the electronic device includes a second joint part 320. The second joint part 320 may move relative to the first housing 100 and the second housing 200. A moving direction is a third direction. The third direction is perpendicular to the first direction, and the third direction is perpendicular to the plane on which the display screen is located. It indicates that the third direction is also perpendicular to the second direction. In addition, the second joint part 320 corresponds to a bottom wall of the first housing 100 and a bottom wall of the second housing 200.

In a process in which the drawn-back state of the electronic device is switched to the drawn-out state, the first housing 100 and the second housing 200 become farther from each other along the first direction, and there is also a gap between the bottom wall of the first housing 100 and the bottom wall of the second housing 200. When the first joint parts 310 move along the second direction, the second joint part 320 moves along the third direction, so that the second joint part 320 joins the bottom wall of the first housing 100 and the bottom wall of the second housing 200. In other words, in a joined state, an edge of the second joint part 320 is in contact with an edge of the bottom wall of the first housing 100 and is also in contact with an edge of the bottom wall of the second housing 200, to fill the gap between the bottom wall of the first housing 100 and the bottom wall of the second housing 200.

Optionally, the second joint part 320 may be connected to the second housing 200, to move with the second housing 200 relative to the first housing 100. The second joint part 320 may alternatively be connected to neither the first housing 100 nor the second housing 200. In other words, the second joint part 320 moves or stays standstill in the third direction and stays fixed in the first direction. Any case in which the gap is formed between the bottom wall of the first housing 100 and the bottom wall of the second housing in a process in which the first housing 100 and the second housing 200 becomes farther from each other, but the second joint part 320 can fill the gap between the bottom wall of the first housing 100 and the bottom wall of the second housing 200 can meet a requirement.

With such disposition, the second joint part 320 can be used to further fill the gap at the bottom walls of the housings of the electronic device, to further provide the electronic device with a better look and further provide better user experience; and to reduce the gap to a larger degree to reduce a possibility that a foreign matter enters the electronic device.

In the embodiments, there are two first joint parts 310 and one second joint part 320. The first joint parts 310 are correspondingly connected to the lateral wall of the second housing 200. The second joint part 320 is correspondingly connected to the bottom wall of the second housing 200. The two first joint parts 310 are respectively located on two ends of the second joint part 320 along the second direction.

With such disposition, the two first joint parts 310 and the second joint part 320 can be used to fill the gap between the first housing 100 and the second housing 200 of the electronic device to a larger degree, to further provide the electronic device with a better look and further provide better user experience; and to reduce the gap to a larger degree to reduce a possibility that a foreign matter enters the electronic device.

Figure 5:
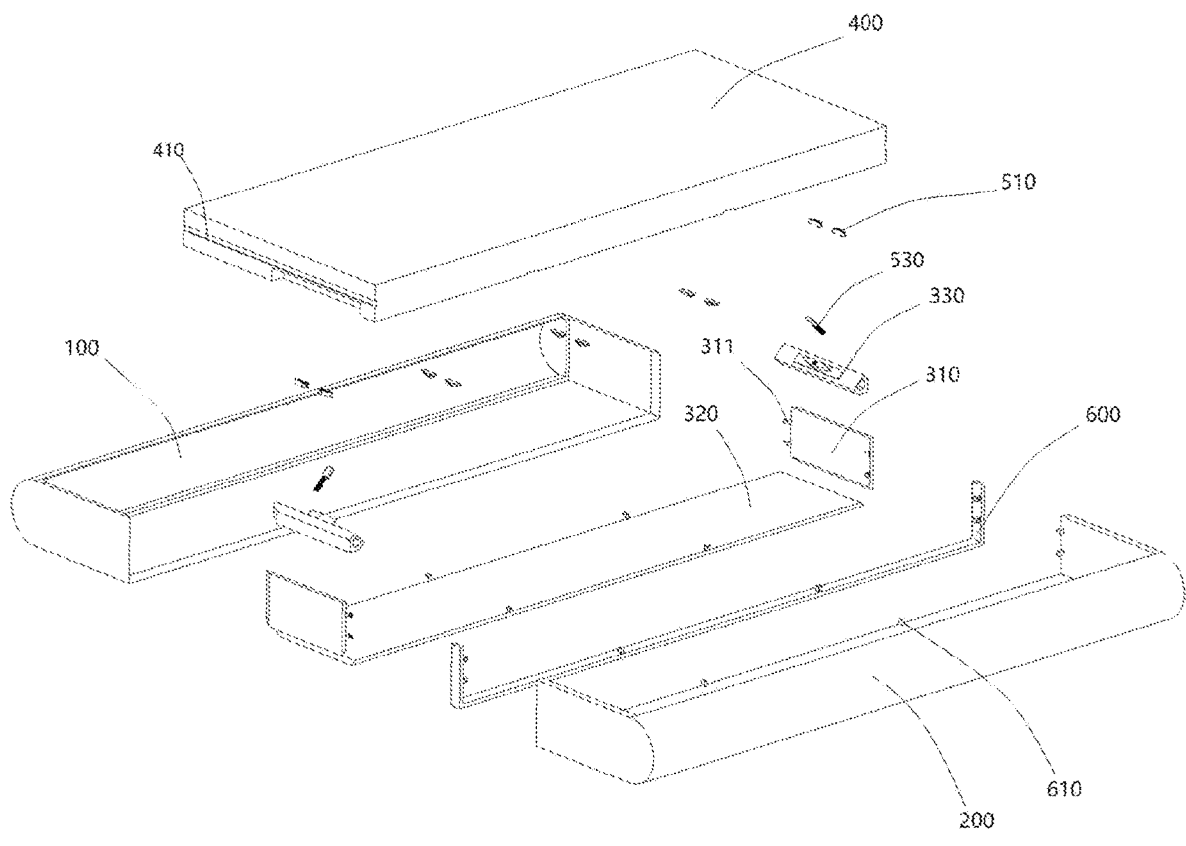
FIG. 5 is a schematic decomposition diagram of an electronic device according to an embodiment of this application.

Optionally, as shown in FIG. 5, the electronic device includes a device body 400. The device body 400 is equivalent to the main structure mentioned above. The device body 400 is fixedly disposed on the first housing 100. Exactly, when the electronic device is in the drawn-out state, the device body 400 is disposed in the first accommodating space, and when the electronic device is in the drawn-back state, the device body 400 is disposed in the second accommodating space.

In this way, the device body 400 can be used to achieve various functions of the electronic device such as displaying an image, playing a sound, and photographing.

A force for moving the first joint parts 310 and the second joint part 320 may be provided manually. That is, the first joint parts 310 are pushed manually to move along the second direction, and the second joint part 320 is pushed manually to move along the third direction. In addition, to steadily dispose the first joint parts 310 and the second joint part 320 at the gap, the edges of the first joint parts 310 and the second joint part 320 may be connected to an opening at an end of the first housing 100 by using a snap-fit structure. Clearly, another detachable connection manner may alternatively be used. Anyway, the first joint parts 310 and the second joint part 320 can move relative to the second housing 200 with a manual action. However, in any manner, a manual action requires more labor, and the electronic device takes a relatively long time to switch between the drawn-back state and the drawn-out state with low switching efficiency.

To resolve the foregoing problem, the electronic device further includes a first actuating mechanism. The first actuating mechanism may be directly disposed on the first housing 100. In the embodiments, the first actuating mechanism is disposed on the device body 400 and is indirectly disposed on the first housing 100. When the electronic device is in the drawn-out state, the first actuating mechanism actuates at least one of the first joint parts 310 and the second joint part 320 to move. Specifically, the first actuating mechanism may actuate the first joint parts 310 to move along the second direction, may actuate the second joint part 320 to move along the third direction, or may actuate the first joint parts 310 to move along the second direction and the second joint part 320 to move along the third direction at the same time.

Optionally, the first actuating mechanism may be an actuating member, for example, a linear actuator, or a cylinder. One end of the first actuating mechanism is connected to the device body 400, and the other end acts on the first joint parts 310 or the second joint part 320. The first actuating mechanism actuates the first joint parts 310 to move along the second direction, or actuates the second joint part 320 to move along the third direction. A force for returning the first joint parts 310 or the second joint part 320 to an original position may be provided manually by pushing, as directly pushing the first joint parts 310 or the second joint part 320 manually from outside the first housing 100 and the second housing 200 is relatively labor-saving. Clearly, in another embodiment, the other end of the first actuating mechanism may be connected to the first joint parts 310 or the second joint part 320, and the first actuating mechanism directly actuates the first joint parts 310 or the second joint part 320 to move and return to an original position.

Figure 7:
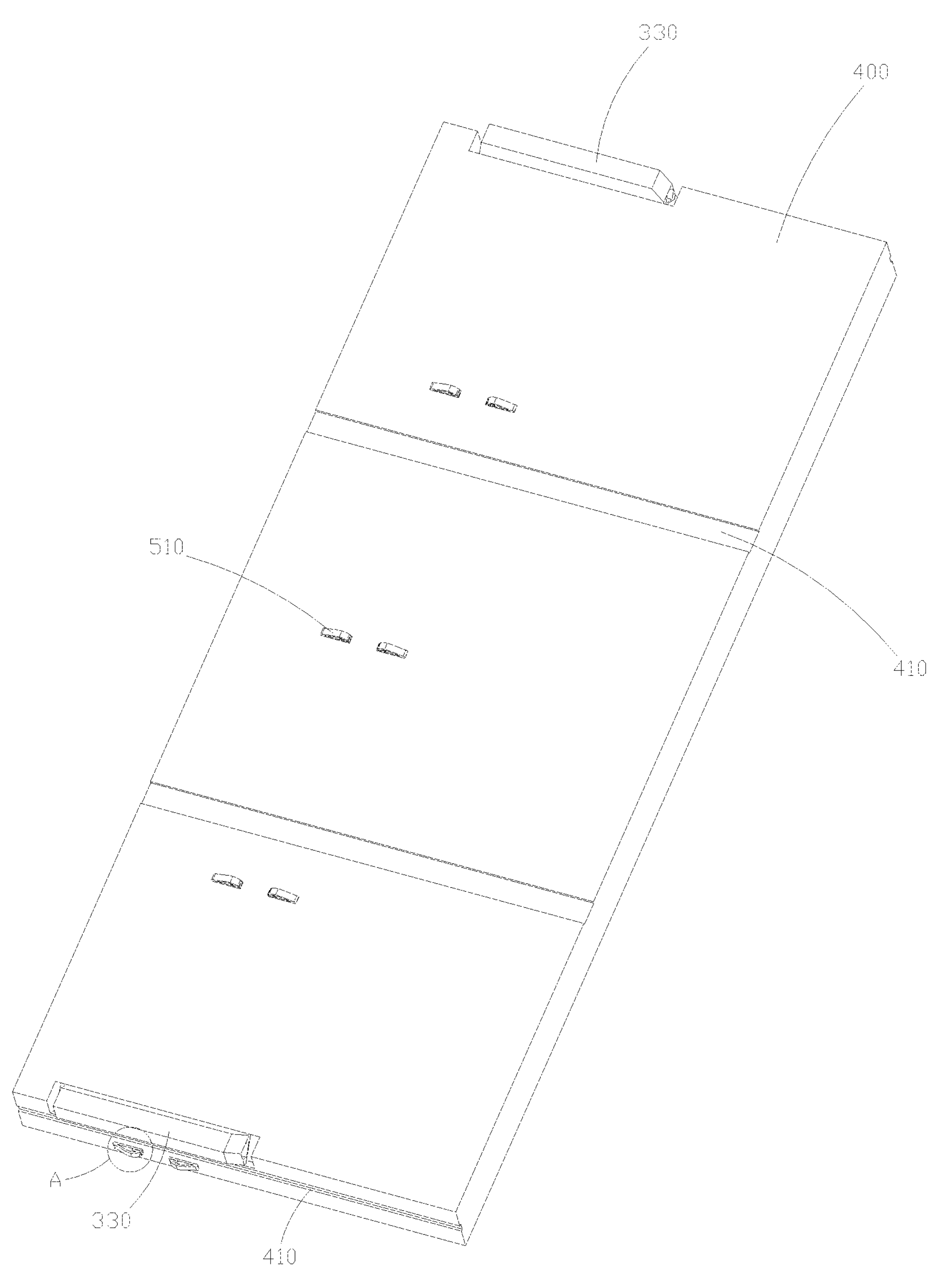
FIG. 7 is a schematic diagram of a device body of an electronic device according to an embodiment of this application.

Optionally, as shown in FIG. 7, the first actuating mechanism includes first elastic members 510. The first elastic members 510 are fixedly disposed on a surface of the device body 400. The first elastic members 510 and the device body 400 may be fixedly connected to each other by welding, bonding, or the like.

When the electronic device is in the drawn-back state, the first elastic members 510 are compressed between the device body 400 and an inner wall of the second housing 200. In this case, the first elastic members 510 accumulates elastic potential energy and prepares for subsequently pushing the first joint parts 310 or the second joint part 320 to move. When the electronic device is in the drawn-out state, because the first elastic members 510 is at a fixed position relative to the device body 400, that is, at a fixed position relative to the first housing 100, as the second housing 200 moves relative to the first housing 100, the first elastic members 510 no longer act on the second housing 200, and the first elastic members 510 act on the first joint parts 310 or the second joint part 320. In this case, the first joint parts 310 or the second joint part 320 cannot resist the tendency of deformation recovery of the first elastic members 510, and the first elastic members 510 has elastic deformation recovery. The first elastic members 510 pushes the first joint parts 310 or the second joint part 320 to move.

With such disposition, the elastic potential energy of the first elastic members 510 is used as an actuating force, with no need to use an electric, pneumatic, or manual power source, so that the implementation is more energy-saving, more convenient, and simpler.

Optionally, the first actuating mechanism includes a plurality of first elastic members 510. The first joint parts 310 and the second joint part 320 both correspond to the first elastic members 510. To be specific, the bottom and two sides of the device body 400 are all disposed with the first elastic members 510, and the first joint parts 310 and the second joint part 320 each correspond to at least one of the first elastic members 510. In the embodiments, the first elastic members 510 may be elastic sheets, but is not limited to elastic sheets.

As shown in FIG. 2 and FIG. 4, each of the first joint parts 310 and the second joint part 320 corresponds to at least two first elastic members 510. The at least two first elastic members 510 form one group. The at least two first elastic members 510 are spaced from each other along a direction in which the first housing 100 and the second housing 200 moves relative to each other, to push a same joint part together to move. In the embodiments, each of the first joint parts 310 and the second joint part 320 corresponds to two elastic sheets.

With such disposition, each first elastic member 510 corresponds to one point of action, and at least two first elastic members 510 provide a same joint part with at least two points of action, so that the first joint parts 310 and the second joint part 320 both can move steadily.

Figure 6:
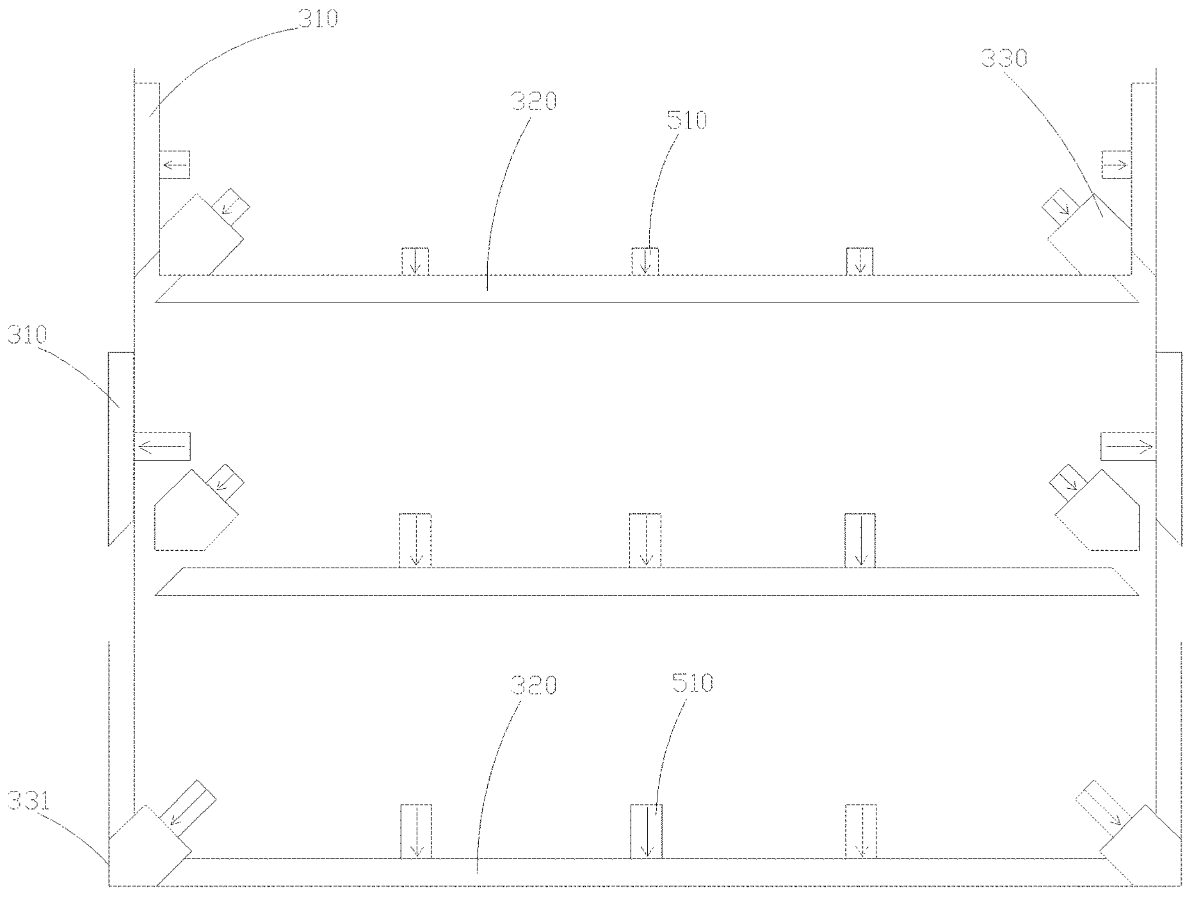
FIG. 6 is a schematic diagram of motion of a first joint part, a second joint part, and a corner member according to an embodiment of this application.

In a further technical solution, as shown in FIG. 6, the electronic device further includes a corner member 330. The corner member 330 is located between the first joint parts 310 and the second joint part 320 that are adjacent to each other. The first actuating mechanism further includes an actuating component. The actuating component is disposed on the device body 400. The actuating component is connected to the corner member 330. The actuating component can actuate the corner member 330 to move straight.

When the electronic device is in the drawn-back state, the actuating component actuates the corner member 330 to move to an inner surface of the first joint parts 310 and the second joint part 320 that are adjacent to each other. When the electronic device is in the drawn-out state, a gap is formed between the first joint parts 310 and the second joint part 320 that are adjacent to each other. The actuating component actuates the corner member 330 to move to the gap, and the corner member 330 are in contact with both the first joint parts 310 and the second joint part 320.

It should be noted that, when the electronic device switches from the drawn-out state to the drawn-back state, the actuating component first needs to move the corner member 330 from the gap to an original position, and the first joint parts 310 and the second joint part 320 are not blocked by the corner member 330, so that the electronic device can resume movement.

With such disposition, the corner member 330 can be used to further seal the gap between the first joint parts 310 and the second joint part 320, so that when the electronic device is in the drawn-out state, the first joint parts 310, the second joint part 320, and the corner member 330 can completely fill the gap between the first housing 100 and the second housing 200, to provide the electronic device with a better look and better user experience to a largest degree and stop a foreign matter from entering the electronic device.

Optionally, the actuating component may be an actuating member, for example, a linear actuator, or a cylinder. One end of the actuating component is connected to the device body 400, and the other end of the actuating component is connected to the corner member 330, to move the corner member 330 for back-and-forth motion.

In the embodiments, as shown in FIG. 4, the actuating component includes an actuating motor 520, a lead screw 530, and a screw bushing 540. A housing of the actuating motor 520 is fixedly disposed on a surface of the device body 400. A power take-off shaft of the actuating motor 520 is connected to the lead screw 530. The lead screw 530 is in a screw-thread fit with the screw bushing 540, and the corner member 330 is connected to the screw bushing 540. The housing of the actuating motor 520 and the device body 400 may be fixedly connected to each other by welding, bonding, or the like. In this way, the power take-off shaft of the actuating motor 520 actuates the lead screw 530 to rotate. As the lead screw 530 and the screw bushing 540 are in a running fit in a rotation direction, the screw bushing 540 can move the corner member 330 to move along an axial direction of the lead screw 530, to finally move the corner member 330. The foregoing structure can use the actuating component as a lead screw actuating mechanism, and the lead screw actuating mechanism has an advantage of high actuating precision to achieve precise actuation.

Figure 8:
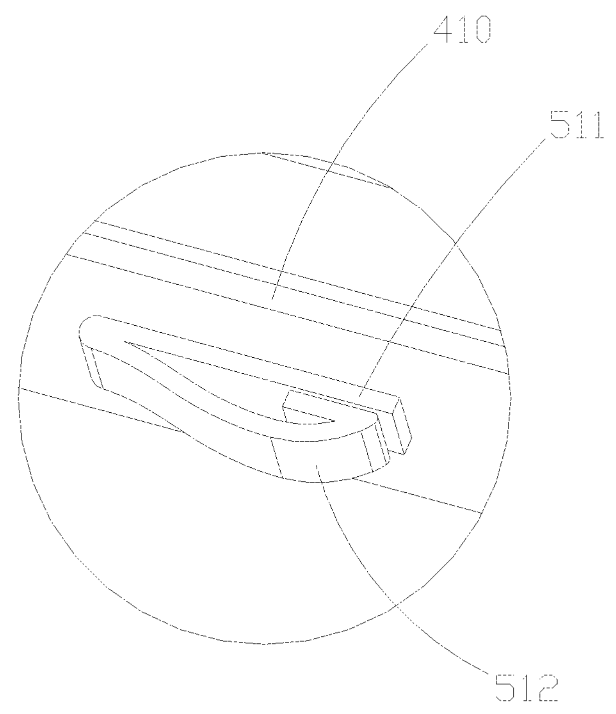
FIG. 8 is an enlarged diagram of a part A in FIG. 7.

In the embodiments, the first elastic members 510 are elastic sheets. As shown in FIG. 8, each elastic sheet includes a fixed part 511 and a curved part 512. The fixed part 511 is fixedly disposed on a surface of the device body 400, that is, indirectly disposed on the first housing 100. Clearly, the fixed part 511 may alternatively be directly disposed on the first housing 100. When the electronic device is in a drawn-back state, the curved part 512 acts on the inner wall of the second housing 200. When the electronic device is in the drawn-out state, the curved part 512 acts on the corresponding first joint parts 310 or second joint part 320.

In an optional embodiment, a pressure sensing element is encapsulated in the curved part 512. When actual pressure that is taken by the first elastic members 510 and that is sensed by the pressure sensing element is greater than a preset threshold, it indicates that the corresponding first joint parts 310 or second joint part 320 may have a foreign matter or have got stuck. In this case, the electronic device sends alarm information to indicate an exception during a switching process of the electronic device and prompt a user to stop a switching action. In this case, the corner member 330 stops moving. Specifically, the electronic device further includes a control apparatus. The control apparatus is electrically connected to the pressure sensing element and the actuating motor 520. When actual pressure sensed by the pressure sensing element is greater than the preset threshold, the control apparatus controls the actuating motor 520 to stop working and further makes the corner member 330 stop moving.

It should be noted that the “preset threshold” does not mean a fixed numerical value but can be set based on a requirement of the user.

With such disposition, pressure sensing information of the pressure sensing element is used to indicate whether a moving process of the first joint parts 310 or the second joint part 320 is normal, and whether the corner member 330 needs to continue to move is controlled based on the information, to prevent an exception that causes damage to the electronic device.

In the embodiments, the pressure sensing element may be a pressure sensor. The pressure sensor is encapsulated in elastic sheets, and pressure taken by the elastic sheets can be monitored in real time through piezoresistive effect. However, the pressure sensing element is not limited to the pressure sensor, and may be another element for pressure sensing.

Optionally, as shown in FIG. 6, the corner member 330 includes an engagement surface 331. When the corner member 330 moves to the gap between the first joint parts 310 and the second joint part 320, a first edge of the engagement surface 331 is connected to an outer surface of one of the first joint parts 310, and a second edge of the engagement surface 331 is connected to an outer surface of the second joint part 320.

In the embodiments, the first joint parts 310 and the second joint part 320 both are platy and perpendicular to each other. The engagement surface 331 further includes two connection surfaces that are perpendicular to each other. One of the connection surfaces is correspondingly connected to the outer surface of the first joint parts 310, the other connection surface is correspondingly connected to the outer surface of the second joint part 320. In other words, one of the connection surfaces is on a same plane as the outer surface of the first joint parts 310, the other connection surface is on a same plane as the outer surface of the second joint part 320.

With such disposition, the first joint parts 310, the second joint part 320, and the corner member 330 fit into each other, to fill the gap between the first housing 100 and the second housing 200 together, so that an outer surface of the electronic device is more even, and there are no bumps and lumps when adjacent parts fit into each other, to further improve user experience.

In a further technical solution, as shown in FIG. 2 and FIG. 4, the electronic device further includes a connection member 600. The connection member 600 is movably disposed on an inner wall of the first housing 100 along the first direction, that is, along a direction in which the first housing 100 and the second housing 200 move relative to each other. The connection member 600 is connected to the first joint parts 310 and the second joint part 320, so that the connection member 600, the first joint parts 310, the second joint part 320, and the second housing 200 move relative to the first housing 100 together. The connection member 600 and the second housing 200 are located on two sides of the first joint parts 310 respectively, and are also located on two sides of the second joint part 320 respectively. In addition, the first joint parts 310 may move relative to the connection member 600 along the second direction, and the second joint part 320 may move relative to the connection member 600 along the third direction. In the embodiments, the connection member 600 is a bar-type structure member, and the bar-type structure member is correspondingly connected to the two first joint parts 310 and the second joint part 320.

Optionally, there is an interspace between the surface of the device body 400 and the inner wall of the first housing 100. The connection member 600 is located in the interspace, so that the connection member 600 can move along the inner wall of the first housing 100.

With such disposition, the connection member 600 can connect ends that are of the first joint parts 310 and the second joint part 320 and that are farther away from the second housing 200, to improve synchrony of various joint parts in a process in which the first joint parts 310 and the second joint part 320 move with the second housing 200, to further improve steadiness of the electronic device during switching.

In an optional embodiment, at least one of the second housing 200 and the connection member 600 is disposed with a limiting protrusion 610. In other words, the limiting protrusion 610 may be disposed on the inner wall of the second housing 200, the limiting protrusion 610 may be disposed on the connection member 600, or limiting protrusions 610 may be disposed on both the inner wall of the second housing 200 and the connection member 600. The limiting protrusion 610 is provided with a limiting groove 611. Specifically, when the limiting protrusion 610 corresponds to the first joint parts 310, the limiting groove 611 faces the first joint parts 310, or when the limiting protrusion 610 corresponds to the second joint part 320, the limiting groove 611 faces the second joint part 320.

In the embodiments, a hook part 311 is provided on an edge of each of the first joint parts 310 and the second joint part 320, the limiting groove 611 is in one-to-one correspondence with the hook part 311, the hook part 311 reaches inside the corresponding limiting groove 611, and the hook part 311 is in contact for limiting with both ends of the limiting groove 611 along a direction in which the first joint parts 310 or the second joint part 320 move relative to the second housing 200. Specifically, a hook part 311 that is located at an edge of the first joint parts 310 is in contact along the second direction for limiting with a first end of the limiting groove 611; and a hook part 311 that is located at an edge of the first joint parts 310 is in contact along the direction opposite to the second direction for limiting with a second end of the limiting groove 611. A hook part 311 that is located at an edge of the second joint part 320 is in contact along the third direction for limiting with the first end of the limiting groove 611; and a hook part 311 that is located at an edge of the second joint part 320 is in contact along a direction opposite to the third direction for limiting with the second end of the limiting groove 611.

In another embodiment, a hook part 311 may be disposed on the edge of the first joint parts 310, or a hook part 311 may be disposed on the edge of the second joint part 320.

With such disposition, in a process in which the first joint parts 310 and the second joint part 320 move relative to the second housing 200, a corresponding hook part 311 synchronously moves in the limiting groove 611. In addition, the limiting groove 611 is used to limit a moving distance of the hook part 311, to prevent the first joint parts 310 and the second joint part 320 from moving too far.

In the embodiments, as shown in FIG. 2 and FIG. 4, the limiting protrusions 610 are disposed on both the inner wall of the second housing 200 and the connection member 600, and hook parts 311 are disposed on two sides of both the first joint parts 310 and the second joint part 320 along the direction in which the first housing 100 move relative to the second housing 200, that is, along the first direction. The hook parts 311 are in one-to-one correspondence with the limiting protrusions 610.

Figure 9:
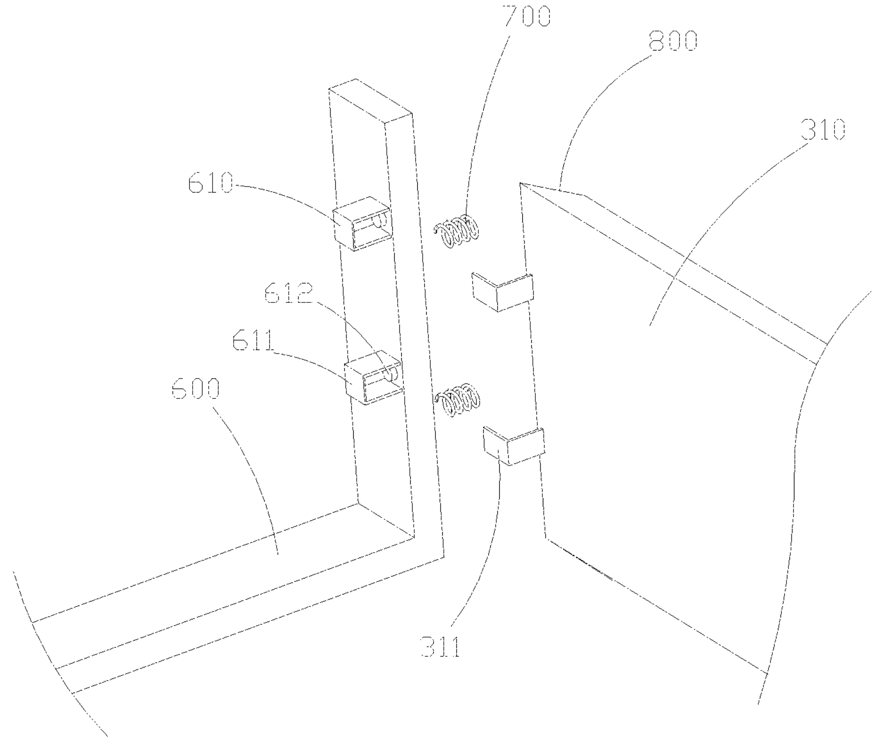
FIG. 9 is a schematic decomposition diagram of a limiting groove and a hook part according to an embodiment of this application.

Optionally, as shown in FIG. 9, a second elastic member 700 is disposed inside the limiting groove 611. The second elastic member 700 is used to drive the hook part 311 to move, that is, used to drive the first joint parts 310 or the second joint part 320 to return to the original position, and the second elastic member 700 is compressed between the hook part 311 and a wall of the limiting groove 611. In the embodiments, the second elastic member 700 may be a spring, but is not limited to the spring.

Optionally, regardless of that the electronic device is in the drawn-out state or the drawn-back state, the elastic member is compressed between the hook part 311 and the wall of the limiting groove 611. To be specific, a degree of compression of the second elastic member 700 when the electronic device is in the drawn-out state is greater than a degree of compression of the second elastic member 700 when the electronic device is in the drawn-back state.

In this way, in any state, the second elastic member 700 accumulates elastic potential energy. When the electronic device is in the drawn-back state, because of elastic effect of the second elastic member 700, the hook part 311 is pressed against the wall of the limiting groove 611, and the hook part 311 is held in between the second elastic member 700 and the wall of the limiting groove 611, to connect the first joint parts 310 and the second housing 200 and connect the second joint part 320 and the second housing 200, so that the first joint parts 310 and the second joint part 320 can move with the second housing 200 relative to the first housing 100. Similarly, with this structure, the first joint parts 310 can be connected to the connection member 600, and the second joint part 320 can be connected to the connection member 600, so that the connection member 600 can move with the first joint parts 310 and the second joint part 320 relative to the first housing 100.

With such disposition, the second elastic member 700 can drive a corresponding first joint part 310 or second joint part 320 to return to the original position, saving an electric, pneumatic, or manual force for pushing, so that switching of the electric device from the drawn-out state to the drawn-back state is relatively labor-saving.

Clearly, in another embodiment, another actuating member for actuating the hook part 311 to move, for example, a cylinder, a linear actuator, or another actuating member that can actuate to move straight, may alternatively be disposed in the limiting groove 611.

Optionally, a limiting structure is disposed inside the limiting groove 611. The limiting structure fits into the second elastic member 700 for limiting along the direction in which the first housing 100 and the second housing 200 move relative to each other, that is, along the first direction. In other words, the limiting structure is used to limit the second elastic member 700 in the limiting groove 611, to prevent the second elastic member 700 from getting out of the limiting groove 611. Specifically, the limiting structure may be a protrusion structure. The protrusion structure is disposed on a side that is of the second elastic member 700 and that is closer to an opening of the limiting groove 611, to stop the second elastic member 700 from getting out of the limiting groove 611.

In the embodiments, as shown in FIG. 9, the second elastic member 700 is a spring, the limiting structure is a limiting column 612, and the spring is sleeved around the limiting column 612. In this way, the spring can also be limited, to prevent the spring from getting out of the limiting groove 611.

In another embodiment, a limiting structure may not be disposed inside the limiting groove 611. An end of the spring is connected to the wall of the limiting groove 611 by welding, bonding, or the like, and the spring can also be prevented from getting out of the limiting groove 611.

In an optional embodiment, as shown in FIG. 7, the surface of the device body 400 is provided with guide slots 410. A guide direction of the guide slots 410 is the same as the direction in which the first housing 100 and the second housing 200 move relative to each other. In other words, the guide direction is the first direction. The limiting protrusions 610 reach inside the guide slots 410, and the limiting protrusions 610 fit into the guide slots 410 slidably. In this way, the guide slots 410 can guide a direction in which the second housing 200 and the connection member 600 move relative to the first housing 100, to ensure a steady motion process and avoid deviation of the moving direction.

Specifically, the surface of the device body 400 is provided with a plurality of guide slots 410, and a quantity of the guide slots 410 is the same as a quantity of limiting protrusions 610 on the inner wall of the second housing 200, with the guide slots in one-to-one correspondence with the limiting protrusions. In addition, the quantity of the guide slots 410 is the same as a quantity of limiting protrusions 610 on the connection member 600, with the guide slots in one-to-one correspondence with the limiting protrusions. In the embodiments, a limiting protrusion 610 on the inner wall of the second housing 200 and a limiting protrusion 610 on the connection member 600 may reach inside a same guide slot at the same time.

In addition, limiting protrusions 610 on the connection member 600 are limited by different guide slots 410, so that the connection member 600 does not get out from between the device body 400 and the first housing 100, to prevent the first joint parts 310 and the second joint part 320 from getting out of the first housing 100 completely.

In a further technical solution, as shown in FIG. 2, FIG. 4, and FIG. 8, at least one of a first end surface of the first housing 100 and a second end surface of the first joint parts 310 is a guide surface 800. The first end surface is an end surface that is of the first housing 100 and that is closer to the second housing 200, and the second end surface is an end surface that is of the first joint parts 310 and that is farther away from the second housing 200. Specifically, the first end surface of the first housing 100 may be disposed as the guide surface 800, the second end surface of the first joint parts 310 may be disposed as the guide surface 800, or both the first end surface and the second end surface may be disposed as guide surfaces.

In the embodiments, both the first end surface and the second end surface may be disposed as the guide surfaces 800. The guide surfaces 800 are inclined surfaces. The guide surface 800 on the first end surface cooperates with the guide surface 800 on the second end surface.

Similarly, a third end surface of the second joint part 320 is further disposed as the guide surface 800. The third end surface is an end surface that is of the second joint part 320 and that is farther away from the second housing 200. The guide surface 800 on the third end surface also cooperates with the guide surface 800 on the first end surface. In this way, along the guide directions of the guide surfaces 800, the first joint parts 310 can move in the direction opposite to the second direction, and the second joint part 320 can move in the direction opposite to the third direction, that is, to facilitate the first joint parts 310 and the second joint part 320 to return to the original position.

With such disposition, when the electronic device is in the drawn-out state, an external force is used to push the first housing 100 or the second housing 200, so that the first housing 100 and the second housing 200 become closer to each other. Specifically, when the external force is used to push the second housing 200, the first joint parts 310 and the second joint part 320 take an acting force close to the first housing 100; and when the external force is used to push the first housing 100, the first housing 100 takes an acting force close to the first joint parts 310 and the second joint part 320.

In any case, the first joint parts 310 and the second joint part 320 become closer to the first housing 100 along the guide surfaces 800. In a process of becoming closer, the first end surface gives a component of force along the direction opposite to the second direction to the first joint parts 310, and gives a component of force along the direction opposite to the third direction to the second joint part 320, to push the first joint parts 310 and the second joint part 320 to return to the original position, with no need to apply an extra external force on the first joint parts 310 and the second joint part 320, so that a switching process is more labor-saving and more convenient.

The embodiments of this application are described above with reference to the accompanying drawings, but this application is not limited to the foregoing specific implementations, and the foregoing specific implementations are only illustrative and not restrictive. Enlightened by this application, a person of ordinary skill in the art can make many forms without departing from the purpose of this application and the protection scope of the claims, all of which fall within the protection of this application.

What is claimed is:

1. An electronic device, comprising a first housing, a second housing, a display screen, and a first joint part, wherein the display screen is disposed on the first housing and the second housing, there are a drawn-out state and a drawn-back state of the electronic device, and when the drawn-back state of the electronic device is switched to the drawn-out state, the first housing and the second housing become farther from each other along a first direction, and the first joint part moves along a second direction to join a lateral wall of the first housing and a lateral wall of the second housing; and the first direction is perpendicular to the second direction, and the first direction and the second direction both are parallel to a plane on which the display screen is located;

wherein the electronic device further comprises a second joint part, and when the drawn-back state of the electronic device is switched to the drawn-out state, the second joint part moves along a third direction to join a bottom wall of the first housing and a bottom wall of the second housing; and the third direction is perpendicular to the first direction, and the third direction is perpendicular to the plane on which the display screen is located;

wherein the electronic device further comprises a corner member and an actuating component, the actuating component is disposed on the first housing, and the actuating component is connected to the corner member, wherein when the electronic device is in the drawn-back state, the actuating component actuates the corner member to move to an inner surface of the first joint part and the second joint part that are adjacent to each other; or when the electronic device is in the drawn-out state, a gap is formed between the first joint part and the second joint part that are adjacent to each other, the actuating component actuates the corner member to move to the gap, and the corner member is in contact with both the first joint part and the second joint part.

2. The electronic device according to claim 1, wherein the electronic device further comprises a first actuating mechanism, the first actuating mechanism is disposed on the first housing, and when the electronic device is in the drawn-out state, the first actuating mechanism actuates at least one of the first joint part or the second joint part to move.

3. The electronic device according to claim 2, wherein the first actuating mechanism comprises a first elastic member, and when the electronic device is in the drawn-back state, the first elastic member is compressed between the first housing and the second housing; or when the electronic device is in the drawn-out state, the first elastic member recovers with elastic deformation and acts on the first joint part or the second joint part.

4. The electronic device according to claim 3, wherein the first elastic member is an elastic sheet, the elastic sheet comprises a fixed part and a curved part, the fixed part is disposed on the first housing, and when the electronic device is in the drawn-back state, the curved part acts on the second housing, or when the electronic device is in the drawn-out state, the curved part acts on the first joint part or the second joint part; and a pressure sensing element is encapsulated in the curved part, wherein when actual pressure sensed by the pressure sensing element is greater than a preset threshold, the electronic device sends alarm information.

5. The electronic device according to claim 1, wherein the actuating component comprises an actuating motor, a lead screw, and a screw bushing, a housing of the actuating motor is disposed on the first housing, a power take-off shaft of the actuating motor is connected to the lead screw, the lead screw is in a screw-thread fit with the screw bushing, and the corner member is connected to the screw bushing.

6. The electronic device according to claim 1, wherein the corner member comprises an engagement surface, and when the corner member moves to the gap, a first edge of the engagement surface is connected to an outer surface of the first joint part, and a second edge of the engagement surface is connected to an outer surface of the second joint part.

7. The electronic device according to claim 1, wherein the electronic device further comprises a connection member, the connection member is movably disposed on an inner wall of the first housing along the first direction, the first joint part and the second joint part both are connected to the second housing, the connection member is connected to the first joint part and the second joint part, the first joint part is capable of moving relative to the connection member along the second direction, and the second joint part is capable of moving relative to the connection member along the third direction.

8. The electronic device according to claim 7, wherein at least one of the second housing or the connection member is disposed with a limiting protrusion, the limiting protrusion is provided with a limiting groove, a hook part is provided on an edge of each of the first joint part and the second joint part, the limiting groove is in one-to-one correspondence with the hook part, the hook part reaches inside the corresponding limiting groove, and the hook part is in contact for limiting with both ends of the limiting groove along a direction in which the first joint part or the second joint part move relative to the second housing.

9. The electronic device according to claim 8, wherein a second elastic member is disposed inside the limiting groove, the second elastic member is used to drive the first joint part or the second joint part to return to an original position, and the second elastic member is compressed between the hook part and a wall of the limiting groove.

10. The electronic device according to claim 9, wherein a limiting structure is disposed inside the limiting groove, and the limiting structure fits into the second elastic member along a direction in which the first housing and the second housing move relative to each other.

11. The electronic device according to claim 8, wherein the electronic device further comprises a device body, the device body is disposed on the first housing, the device body is provided with a guide slot, an extension direction of the guide slot is the same as the direction in which the first housing and the second housing move relative to each other, and the limiting protrusion reaches inside the guide slot and fits into the guide slot slidably.

* * * * *